United States Patent [19]

Carr

[11] Patent Number: 4,629,837

[45] Date of Patent: Dec. 16, 1986

[54] INTERLOCK ARRANGEMENT FOR RADIOPAGER SWITCHES

[75] Inventor: Peter B. Carr, Harpenden, England

[73] Assignee: STC plc, London, England

[21] Appl. No.: 777,413

[22] Filed: Sep. 18, 1985

[30] Foreign Application Priority Data

Sep. 18, 1984 [GB] United Kingdom ................ 8423582

[51] Int. Cl.[4] .......................... H01H 9/26; H04B 1/44

[52] U.S. Cl. .................................. 200/50 C; 455/78

[58] Field of Search ........... 200/5 R, 5 B, 5 E, 16 R, 200/16 C, 16 D, 17 R, 18, 329, 330, 50 C, 52 R, 61.58 R; 455/73, 78, 83, 90

[56] References Cited

U.S. PATENT DOCUMENTS

| | | | |
|---|---|---|---|
| 3,290,454 | 12/1966 | Hubert | 200/5 R |
| 3,470,339 | 9/1969 | Roman | 200/50 C X |
| 3,784,765 | 1/1974 | Daly | 200/16 D X |
| 4,115,670 | 9/1978 | Chandler | 200/50 C X |
| 4,147,904 | 4/1979 | Carpenter et al. | 455/78 X |
| 4,322,588 | 3/1982 | Chumley et al. | 200/16 C X |
| 4,461,033 | 7/1984 | Todo | 455/78 X |

*Primary Examiner*—J. R. Scott

*Attorney, Agent, or Firm*—Kerkam, Stowell, Kondracki & Clarke

[57] ABSTRACT

An interlock arrangement for two slide switches in a radio pager eliminates incorrect switch operation. The casing contains two switches (A and B) with respective switch members (15, 16) located inside the casing. Switch member (15) has a cam follower (**15*b*) on a resilient arm which co-operates with one or the other of two indents (13, 14). Switch member (16) has a chamfered end (16*a*). The chamfered end (16*a*) and the cam follower (15*b*) are shaped so that when switch member (15) is in position 1, the other switch member (16) locks switch member (15). If switch member (15) is inadvertently operated toward position 2, the chamfered end (16*a*) of switch member (16) will abut against the undersurface of the resilient arm cam follower (15*b*) thereby forcing the cam follower into more positive engagement with indent (13). Each switch (A or B) has two positions. In order for the interlock arrangement to be effective, each switch member must be located in the same position, for example position 1 or position 2.**

7 Claims, 5 Drawing Figures

INTERLOCK ARRANGEMENT FOR RADIOPAGER SWITCHES

BACKGROUND OF THE INVENTION

This invention relates to battery operated hand-held radio equipment, particularly but not exclusively radiopagers and switches therefor.

Currently there are a variety of small electronic radiopagers which are battery powered and which are designed to maximise battery life by inhibiting certain operations, either by automatic intermittent switching of power supplies or by selective switching of the power supply to different parts of the circuit when particular functions are required.

PRIOR ART

There already exist various radiopagers in which a switch controls "power on/off" and "tone on/memory". The switch is a three-position slide switch which has a first position which switches the power off, a second position which switches the power to memory without the tone so that the pager can receive a call without disturbing the user in for example a business meeting, and a third position in which the tone is on and "alerts" the user when a call is received.

It is desirable that the power should not be inadvertantly switched off when the pager is receiving and storing message signals otherwise the signals, that is "stored calls", will be lost. One known arrangement for achieving this has a rotary locking member separate from the switch and which locks the three-position slide switch in "memory" position until it is rotated to unlock the switch. Then the switch can be moved to the "power-off" position. However this is a complex solution and requires both hands of the user to rotate the locking member and at the same time, move the switch to "power off" position.

Another attempt to overcome this problem arranges the mid-position of the three-position slide switch to be the "alert" position so that the user must move the switch over its total travel from one end position (memory) to the opposite end position (power off) via the alert position and this to some extent reduces the incidence of inadvertent switch off in "memory" position, but is not a completely satisfactory solution.

OBJECT OF THE INVENTION

An object of the invention is to provide in a simple costeffective manner a battery operated hand-held radio equipment with a switch arrangement which overcomes the aforementioned problems.

SUMMARY OF THE INVENTION

According to one aspect of the present invention there is provided a hand-held battery-powered radio receiver having a pair of manually-operable switches to switch the receiver between a "memory" mode of operation enabling the receiver to store incoming messages in a memory, an "alert" mode of operation providing an indication that there is an incoming message, and a "battery-off" mode, wherein a first manually-operable slide switch is operable to switch the receiver into either one of the "memory" and "alert" modes, as desired by the user, and a second manually-operable slide switch is operable to switch on and off power from the battery supply, wherein the slide switches each have a slide actuator member, the slide actuator members being formed with cooperating interlock portions whereby that a situation in which the first switch is in a position for "memory" mode and the second switch is in a position in which the power is switched off is prevented.

According to another aspect of the present invention there is provided a switch arrangement for use in a hand-held battery-powered radio apparatus for switching the apparatus between different modes of the apparatus being contained within a casing, the switch arrangement including two manually-operable slide switches each having a slide actuator member, the actuating members being formed with cooperating interlock portions each separately moveable over a common surface portion of the casing, the interlock portions being so arranged as to prevent both interlock portions overlying said common surface portion at the same time.

According to a further aspect there is provided a slide switch arrangement for use in a hand-held battery-powered radio equipment, including a casing carrying a pair of slide switches for controlling the modes of operation of the equipment, the two switches each having a slide actuator member, the actuator members being formed with cooperating interlock portions which can overlie a portion of a common surface of the casing, said common surface having two indents; wherein the first switch actuator member has a resilient cam-follower protrusion engageable with one or the other of said indents, dependent on the position of that switch member, wherein the second switch actuator member has a portion so shaped as to abut the cam follower protrusion when either switch actuator member is fully operated towards the other switch actuator member, and wherein said shaped portion and said cam follower protrusion are so profiled that when they abut because one switch actuator member has been moved towards the other switch actuator member attempted movement of that other switch actuator member towards the one switch actuator member urges the cam follower protrusion into more positive engagement with the relevant one of said indents, thus preventing effective movement of the other switch actuator member towards the one switch actuator member.

BRIEF DESCRIPTION OF THE DRAWINGS

An embodiment of the invention will now be described with reference to the accompanying drawings, in which.

DESCRIPTION OF THE PREFERRED EMBODIMENT

Figures 1, 2, 3:
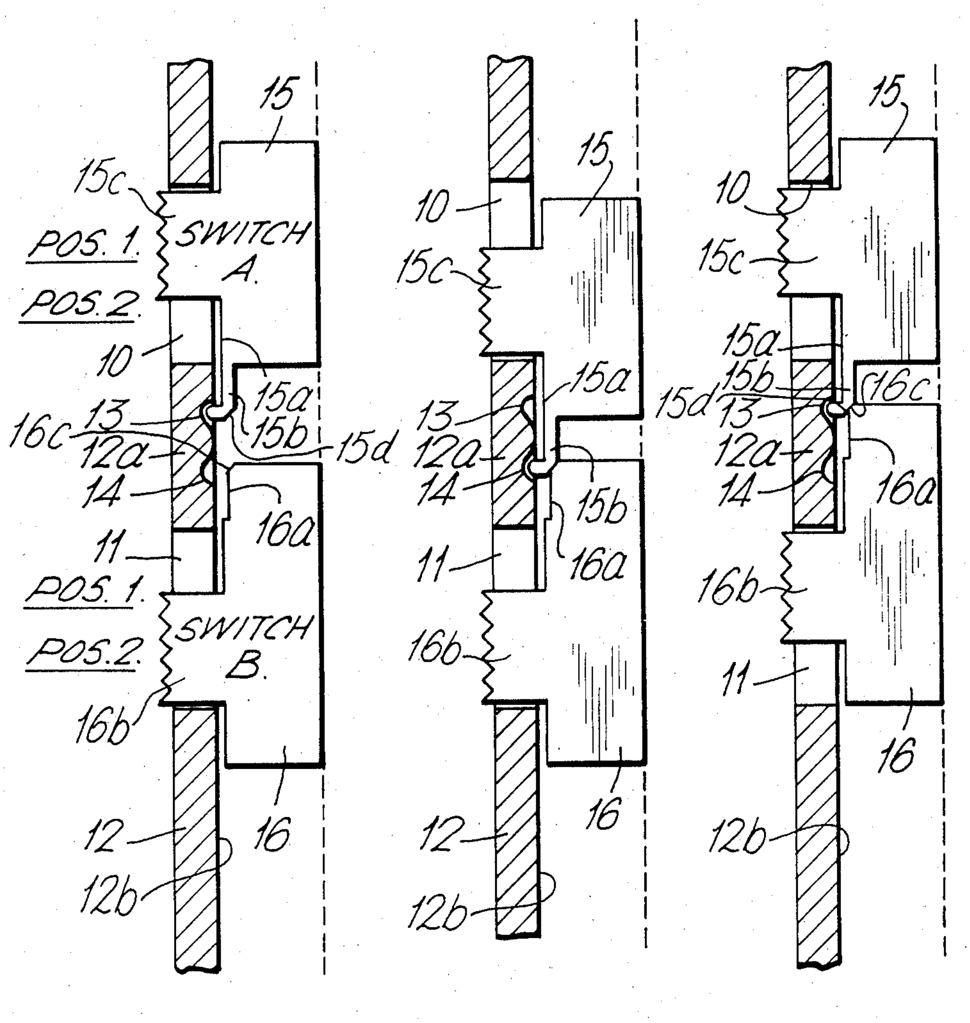
FIGS. 1–3 depict the construction of two interlocking switches of a tone-only radio pager.

Two slide switches A, B are arranged for colinear operation in adjacent apertures 10, 11 in the casing wall 12 of for example a tone-only radiopager. The apertures 10, 11 are separated by an intermediate wall portion 12*a* which is formed with two indents 13, 14 on its inner surface 12*b*. The slide switches A, B are fabricated with moulded plastics slide actuator members 15, 16 having operating portions 15*c*, 16*b* which project through the respective apertures 10, 11 and have portions 15*a*, 16*a* which overlie the inner surface of the casing wall adjacent the apertures, in particular the intermediate wall portion 12a. Slide member 15 has its overlying portion 15a extended to form a resilient cam-follower 15b which engages either indent 13 or indent 14, depending on the position of switch A. Slide member 16 has its overlying portion 16a shaped to abut the cam-follower 15b when either switch is operated toward the other. The abutting surfaces 15d, 16c of the cam-follower 15b and the co-operating portion 16a are chamfered, as shown. Therefore when one switch is in its operating position nearest the other switch, any attempted movement of that other switch towards the one switch causes the cam-follower 15b to be jammed more firmly into the relevant indent thereby interlocking the switches.

Figure 5:
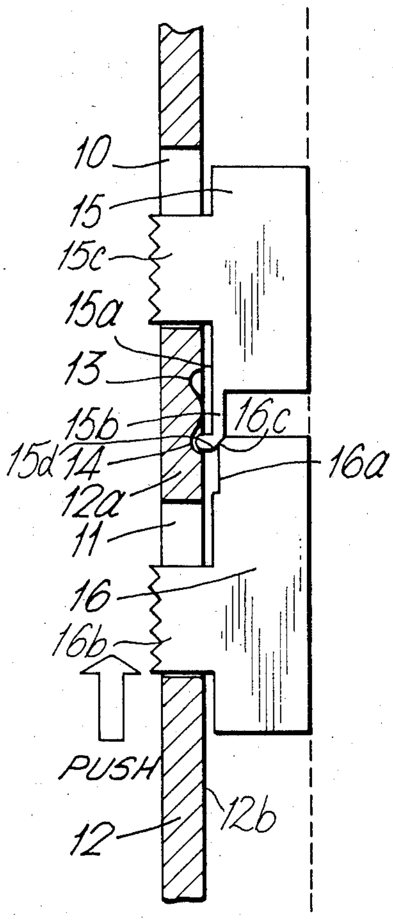

Thus when switch A is in its position 1 and switch B is in its position 2, as shown in FIG. 1, either one switch or the other can be operated to its other position. In the radio-pager the switch positions as shown in FIG. 1 are identified with a normal or "alert" operating mode (i) in which the power is "on" (switch B) and the pager does not store incoming calls but generates an audible tone for each call (switch A). When switch A is operated to its position 2, see FIG. 2, the pager is in mode (ii) (memory mode) in which the power is still "on" (switch B) but calls are now routed into a memory for storage. It is now impossible to move switch B to its position 1 as shown in FIGS. 2 and 5. This ensures that the power cannot be switched off inadvertantly, which would cause the loss of incoming calls.

Figure 4:
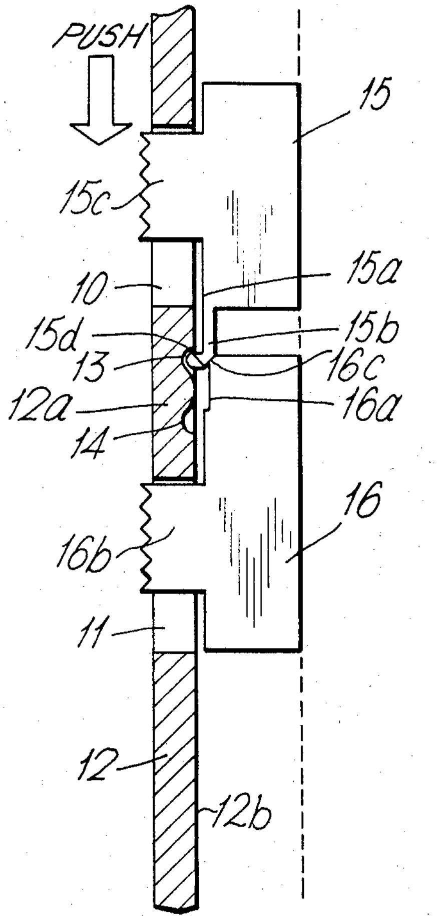
FIGS. 4 and 5 depict the operation of the switches of FIGS. 1–3.

Conversely, if switch B is first moved to its position 1 to switch "off" the power then switch A cannot be moved from the "tone on" position 1 to the "memory on" position 2 (mode iii), as shown in FIGS. 3 and 4. Thus in FIG. 4, it will be seen that the chamfered surface 16c of portion 16a abuts the chamfered surface 15d of portion 15a. It then jams because of the force direction. FIG. 5, referred to above, shows a similar camming and jamming action with switch A in position 2 and switch B also in position 2.

The invention therefore provides an effective interlock arrangement of the two switches with simple moulded plastics shapes in the switch parts and holding casing, without the need for extra parts.

It is to be understood that other modes of operation can be interlockingly controlled in similar manner. For example a display pager in which the memory is always active and the tone is either muted (corresponding to "memory" mode in a tone-only pager) or not muted (corresponding to "alert" mode in a tone only pager) can utilise a switch arrangement in accordance with the present invention.

It has been found that the interlocked two switch arrangement is significantly more effective than the prior art arrangements referred to earlier and yet enables cheap manufacture and allows operation with one hand for example the thumb.

I claim:

1. A hand-held battery-powered radio receiver having a pair of manually-operable slide switches to switch the receiver between a "memory" mode of operation enabling the receiver to store incoming messages in a memory, an "alert" mode of operation providing an indication that there is an incoming message, and a "battery-off" mode, wherein one of the manually-operable slide switches is operable to switch the receiver into either one of the "memory" and "alert" modes, as desired by the user, and the other manually-operable slide switch is operable to switch on and off power from the battery supply, wherein the slide switches each have a slide actuator member, the slide actuator members being formed with cooperating overlapping interlock portions such that a situation in which the first switch is in a position for "memory" mode and the second switch is in a position in which the power is switched off is prevented.

2. A receiver as claimed in claim 1, including a casing, the switch slide actuator members being located in respective apertures in the casing wall, the slide actuator members being arranged for colinear operation.

3. A switch arrangement for use in a hand-held battery-powered radio apparatus for switching the apparatus between different modes of operation, the apparatus being contained within a casing, the switch arrangement including two manually-operable slide switches each having a slide actuator member, each slide actuator member being formed with cooperating interlock portions separately moveable over a common surface portion of the casing, the interlock portions overlapping and abutting one another so as to prevent inadvertent switch actuation of one of the switches and also to prevent both interlock portions overlying said common surface at the same time.

4. A slide switch arrangement for use in a hand-held battery-powered radio equipment, including a casing carrying a pair of slide switches for controlling the modes of operation of the equipment, the two switches each having a slide actuator member, the actuator members being formed with cooperating interlock portions which can overlie a portion of a common surface of the casing, said common surface having two indents, wherein the first switch actuator member has a resilient cam-follower protrusion engageable with one or other of said indents dependent on the position of that switch actuator member, wherein the second switch actuator member has a shaped portion which abuts and overlaps the cam-follower protrusion when either switch actuator member is fully operated towards the other switch actuator member, and wherein said shaped portion and said cam-follower protrusion are so profiled that when they abut because one switch actuator member has been moved towards the other switch actutor member attempted movement of that other switch actuator member towards the one switch actuator member urges the cam-follower protrusion into more positive engagement with the relevant one of said indents thus preventing effective movement of the other switch actuator member towards the one switch actuator member.

5. An arrangement as claimed in claim 4, wherein said common surface is the inner face of a side wall of the casing, wherein the side wall has two apertures aligned with the direction of movement of the switch actuator members, and wherein each said switch actuator member has an operating portion projecting through a respective one of said apertures.

6. An arrangement as claimed in claim 5, wherein said cam-follower protrusion is on a resilient arm on the first switch actuator member, which resilient arm extends parallel with and adjacent to said inner face.

7. An arrangement as claimed in claim 6, wherein the shaped portion of said second switch actuator member is a chamfer which cooperates with a chamfer on the back of said arm.

* * * * *